(12) United States Patent
Pérez Grovas

(10) Patent No.: US 9,319,907 B2
(45) Date of Patent: Apr. 19, 2016

(54) RATE ADAPTATION FOR WIFI BASED WIRELESS SENSOR DEVICES

(71) Applicant: GainSpan Corporation, San Jose, CA (US)

(72) Inventor: Alfredo Eduardo De Jesus Pérez Grovas, Menlo Park, CA (US)

(73) Assignee: GAINSPAN CORPORATION, San Jose, CA (US)

( * ) Notice: Subject to any disclaimer, the term of this patent is extended or adjusted under 35 U.S.C. 154(b) by 229 days.

(21) Appl. No.: 14/050,230

(22) Filed: Oct. 9, 2013

(65) Prior Publication Data

US 2015/0098354 A1    Apr. 9, 2015

(51) Int. Cl.
*H04W 24/04* (2009.01)
*H04W 24/08* (2009.01)

(52) U.S. Cl.
CPC .............. *H04W 24/04* (2013.01); *H04W 24/08* (2013.01)

(58) Field of Classification Search
USPC .................................. 370/252, 465, 253, 332
See application file for complete search history.

(56) References Cited

U.S. PATENT DOCUMENTS

| | | | |
|---|---|---|---|
| 8,693,331 B1* | 4/2014 | Sampath et al. | 370/232 |
| 2005/0249157 A1* | 11/2005 | Qian et al. | 370/329 |
| 2005/0286440 A1* | 12/2005 | Strutt et al. | 370/253 |
| 2008/0117888 A1* | 5/2008 | Popescu et al. | 370/342 |
| 2010/0082834 A1* | 4/2010 | Joung et al. | 709/231 |
| 2015/0016281 A1* | 1/2015 | Jagetiya et al. | 370/252 |

* cited by examiner

*Primary Examiner* — Habte Mered
*Assistant Examiner* — Rownak Islam
(74) *Attorney, Agent, or Firm* — Seyfarth Shaw LLP; Puya Partow-Navid

(57) ABSTRACT

A rate selection method for WiFi based wireless sensor devices include storing parameters of communication packets successfully transmitted and received by a wireless device prior to turning off a wireless device, comparing a first set of parameters of a received communication signal to the parameters of the received communication packets and identifying at least one received communication packet of the communication packets based on the comparison of the first set of parameters. The rate selection method also includes comparing a second set of parameters of the received communication signal to the parameters of the identified at least one received communication packet to identify a close received communication packet of the identified at least one received communication packet and identifying a communication rate for current packets communicated by the wireless device based on the comparison of the second set of parameters.

16 Claims, 3 Drawing Sheets

RATE ADAPTATION FOR WIFI BASED WIRELESS SENSOR DEVICES

BACKGROUND

1. Field

Aspects of the present disclosure relate to wireless local area network (WLAN) communications, and more particularly to rate adaptation for Wi-Fi based wireless sensor devices.

2. Background

Current rate selection algorithms in Wi-Fi systems are geared to select the appropriate transmission rates for devices that are always on, and can therefore rely on a constant stream of metrics (CINR, SSID, Packet Error rate, throughput, etc.) measured on data constantly transmitted by those devices.

This type of scenario, however, is not the scenario under which low power Wi-Fi sensor devices will operate. Wi-Fi-based sensors will remain with their radios turned off for large amounts of time and only wake up at the moments they are due to transmit sensor data in order to limit their current consumption and thus extend their battery lifetimes. For example, a Wi-Fi sensor might turn off its radio for a period of 5 minutes and then turn it on for only a few hundreds of milliseconds to transmit data.

Because Wi-Fi-based sensors turn on their radio for short amounts of time, the amount of performance metrics they gather may be limited. For example, the Wi-Fi-based sensor may only have a small amount of time prior to a time the Wi-Fi-based sensor transmits data to be able to gather information regarding the current state of the channel. Further, the performance metrics gathered by the Wi-Fi-based sensor may not be current or stale with respect to a standard configuration. Indeed, if the Wi-Fi-based sensor uses information regarding the state of the channel that is gathered by the Wi-Fi-based sensor prior to turning off its radio, that information could have been gathered at a time far back in the past (minutes or even hours) compared to the time at which the sensor turns on its radio one more time to transmit data.

As a result, the typical Wi-Fi rate selection algorithms, designed for traditional always-on radios very poorly suited for usage for Wi-Fi-based sensor applications.

SUMMARY

According to one aspect of the present disclosure, a method for wireless communication includes storing parameters of communication packets successfully transmitted and received by a wireless device prior to turning off a wireless device. The method may also include comparing a first set of parameters of a received communication signal to the parameters of the received communication packets. The method may also include identifying at least one received communication packet of the communication packets based on the comparison of the first set of parameters. The method may also include comparing a second set of parameters of the received communication signal to the parameters of the identified at least one received communication packet to identify a close received communication packet of the identified at least one received communication packet. The method may also include identifying a communication rate for current packets communicated by the wireless device based on the comparison of the second set of parameters. The method may also include storing parameters of communication packets successfully transmitted and received by a wireless device prior to turning off a wireless device;

According to another aspect of the present disclosure, an apparatus for wireless communication includes means for comparing a first set of parameters of a received communication signal to the parameters of the received communication packets. The apparatus may also include means for identifying at least one received communication packet of the communication packets based on the comparison of the first set of parameters. The apparatus may also include means for comparing a second set of parameters of the received communication signal to the parameters of the identified at least one received communication packet to identify a close received communication packet of the identified at least one received communication packet. The apparatus may also include means for identifying a communication rate for current packets communicated by the wireless device based on the comparison of the second set of parameters.

According to one aspect of the present disclosure, an apparatus for wireless communication includes a memory and a processor(s) coupled to the memory. The processor(s) is configured to store parameters of communication packets successfully transmitted and received by a wireless device prior to turning off a wireless device. The processor(s) is further configured to compare a first set of parameters of a received communication signal to the parameters of the received communication packets. The processor(s) is further configured to identify at least one received communication packet of the communication packets based on the comparison of the first set of parameters. The processor(s) is further configured to compare a second set of parameters of the received communication signal to the parameters of the identified at least one received communication packet to identify a close received communication packet of the identified at least one received communication packet. The processor(s) is further configured to identify a communication rate for current packets communicated by the wireless device based on the comparison of the second set of parameters.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Proposed is a rate selection algorithm or implementation for radio access technology based sensor devices, such as Wi-Fi-based sensor devices that are not always on. For, example, the proposed rate selection algorithm may be applicable to low power Wi-Fi based sensors, which are generally turned off until the sensors are due to transmit sensor data when the sensors are turned on. Turning off the sensors when the sensors are not transmitting reduces power consumption and saves battery life. Aspect of the present disclosure may be implemented in two separate configurations. One configuration may incorporate rate selection algorithms or implementations prior to turning off the radio access technology based sensor (the sensor). The other configuration may incorporate rate selection algorithms after turning on the sensor. In some aspects, the two configurations can be implemented in conjunction. In other aspects, the two configurations can be implemented separately. In one aspect, the device may be a radio access technology based on a sensor of a wireless device.

Wireless Communication System

Figure 1:
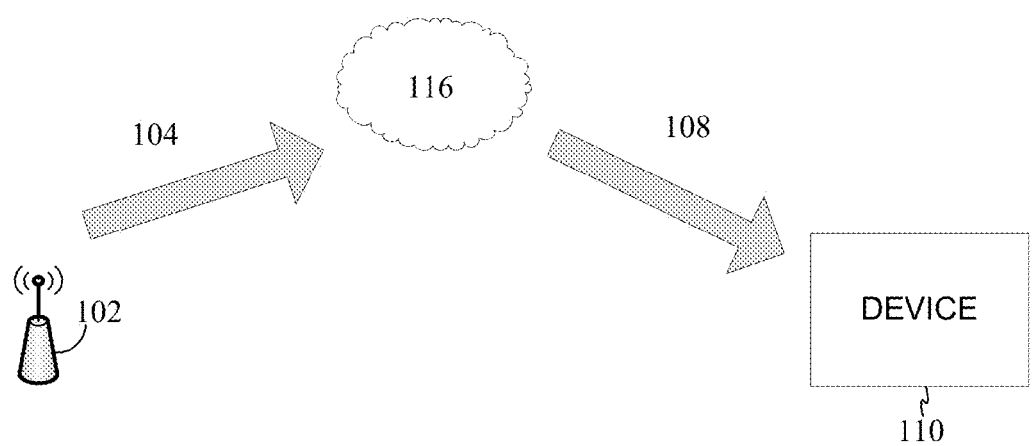
FIG. 1 illustrates a wireless communication system according to one or more aspects of the present disclosure.

FIG. 1 illustrates a wireless communication system according to one or more aspects of the present disclosure. A wireless device 110 may be a wireless sensor in communication with an access point or base station 102 and using various wireless communication protocols according to an aspect of the present disclosure.

The access point 102 can send or transmit data/packets, information and messages to wireless device 110 via a network export protocol 104, a wireless network 116 and a network import protocol 108. Similarly, the wireless device 110 may transmit and receive communication signals (e.g., packets, beacons) to and from the access point 102. An example of the network export protocol 104 and the network import protocol 108 is 802.11 WiFi (WiFi).

The access point 102 of the wireless communication system may include process resources and memory resources to manage wireless communications, such as IEEE 802.11 (WiFi) by allocating resources and parameters, granting/denying requests from a wireless device 110.

Step 1—Prior to Radio Access Technology Based Sensor Turn-Off

Before turning off the radio access technology based sensor, the sensor retrieves information, such as history of packets received from an access point. The retrieved information of the received packet may include features such as a time the packet was received from an access point or base station, a transmission rate associated with a transmission of a packet from the access point, a received signal strength indication (RSSI) for a received packet and a carrier to interference plus noise ratio (CINR) for the received packet.

In addition, before turning off the sensor, the sensor retrieves information, such as history of packets transmitted by the wireless device to the access point. The retrieved information of the transmitted packet may include features such as the time the packet was transmitted from the wireless device, the transmission rate associated with the transmission of the packet from the wireless device, an acknowledgement (ACK)/negative acknowledgement (NAK) by the access point and information related to whether the packet was blindly transmitted by the wireless device.

The retrieved information may be organized into a table, such as Table 1, and stored in a memory of the sensor or a memory of a radio access technology device associated with the sensor. In one aspect of the disclosure, the table may only include information relating to packets successfully transmitted by the wireless device and/or packets transmitted by the access point at a predefined time before or after such packets were successfully transmitted by the wireless device and/or the access point. In this aspect, the successfully transmitted packets by the wireless device may be packets for which a media access control (MAC) layer acknowledgement was received after being transmitted. The predefined time may be a few milliseconds before or after such packets were successfully transmitted. Table 1 is an exemplary table of retrieved information according to one or more aspects of the present disclosure. The time, modulation rate, RSSI and CINR and other parameters in this table and other tables may be selected for illustrative purposes.

TABLE 1

| Packet No. | Was Packet transmitted by WD or Access Point (AP)? | Packets transmitted by WD | | Was packet transmitted blindly? | Packets transmitted by AP | | | |
|---|---|---|---|---|---|---|---|---|
| | | Tx Time | Tx Rate | | Tx Time | Tx Rate | RSSI | CINR |
| 1 | AP | | | | 98 mSec | 11 mbps | -aa dBm | xx dB |
| 2 | WD | 100 mSec | 1 mbps | Yes | | | | |
| 3 | AP | | | | 120 mSec | 2 mbps | -bb dBm | yy dB |
| 4 | AP | | | | 123 mSec | 5.5 mbps | -cc dBm | |
| 5 | WD | 125 mSec | 5.5 mbps | No | | | | |
| 6 | AP | | | | 129 mSec | 1 mbps | -dd dBm | zz dB |

The table may be updated to include new information of a current period in which the radio access technology is turned on. For example, new lines of information are retrieved for the table for packets transmitted and received during a current radio turn-on cycle every time the radio access technology is turned on. The size of the table, e.g., table length, may be based on the memory allocated by the sensor for the table implementation. Table 1, which is based on the retrieved information acquired prior to turning off the sensor, may be stored into a memory, e.g., a system memory of the wireless device, prior to turning off the sensor. The system memory may be incorporated into the sensor or may be independent but coupled to the sensor.

Step 2: After Turning on the Radio Access Technology Based Sensor

When the radio access technology is turned back on, the information retrieved and arranged according to Table 1, may be used in conjunction with current metrics or parameters obtained after the radio access technology is turned on to determine a modulation rate for transmitting sensor data by the Wi-Fi enabled sensor. In one aspect of the present disclosure, to determine the modulation rate for transmitting the sensor data, the Wi-Fi enabled sensor listens to a communication signal, e.g., beacon, transmitted by the access point after the radio access technology is turned on, and retrieves transmission rate, RSSI and CINR metrics for the received beacon. The Wi-Fi enabled sensor then scans or looks-up the information in Table 1 built prior to turning the radio access technology off for occurrences of packets transmitted by the access point that match or are close to the data rate of the currently received beacon. For example, if the access point transmitted a current beacon packet at 1 mbps after the radio access technology is turned on, and then the Wi-Fi enabled sensor may identify packet number 6 in Table 1, which has a data transmission rate of 1 mbps that matches or is closest to the transmission rate of the current beacon packet. The identified packet in Table 1 may be referred to as an equivalent access point packet. When the corresponding transmission rates are matched, the Wi-Fi enabled sensor may provide an indicator, such as an equivalent access point indicator, to indicate the matching relationship between the currently transmitted beacon and the identified equivalent access point packet in Table 1. Other equivalent access point packets may be identified similarly.

In one aspect of the present disclosure, a rate selection implementation may compare features of the current beacon to features of the equivalent access point packet as well as features of one or more packets transmitted by the wireless device when certain conditions are met. For example, the comparison may be implemented if the equivalent access point packet was transmitted at a time within some tolerance of time, (e.g., a single channel coherence time) from a time of transmission (before the sensor was turned off) of any packet that was transmitted successfully by the wireless device. Thus, the condition is met when the equivalent access point packet is transmitted within a predetermined time after a packet is successfully transmitted by the sensor or wireless device. Similarly, the comparison may be implemented when the successfully transmitted packet was not transmitted blindly. A packet from the wireless device is deemed successfully transmitted when an ACK from the access point is received for the packet transmitted. The features of the successfully transmitted packet may be incorporated in Table 1 as described.

In one aspect of the disclosure, the comparison includes a comparison of features, such as the RSSI and CINR of the equivalent AP packets and the current beacon packet when the conditions are met. For example, the rate adaptation or selection implementation may compare the RSSI and CINR of the current beacon packet received after the radio is turned on to the RSSI and CINR of any equivalent access point packets. The comparison may also include a comparison of the transmission rate of packets successfully transmitted by the wireless device within the tolerance of the single channel coherence time away from the relevant equivalent AP packet received at times before the radio was turned off. Thus, the relevant equivalent AP packet means is transmitted within a predetermined time after a packet is successfully transmitted by the wireless device. Examples of the features compared are illustrated in Table 2.

From the generated table, i.e., Table 2, the equivalent access point packet that has parameters, e.g., CINR and RSSI, closest to the CINR and RSSI of the current beacon packet may be deemed the closest equivalent access point packet. In one aspect of the disclosure, the equivalent access point packet with the closest parameter may be determined based on a calculated difference between parameters of the current beacon packet and parameters of the equivalent access point packet packets previously stored.

For example, the difference, D, between parameters of the current beacon packet and the stored parameters of the equivalent access point packets, may be calculated as follows:

$$D = \text{Alpha}[\text{absolute value}(\text{current beacon packet RSSI} - \text{equivalent access point packet RSSI})] + \text{Beta}[\text{absolute value}(\text{current beacon packet CINR} - \text{equivalent access point packet CINR})]$$

where Alpha and Beta are empirically calculated constants that are calculated based on an implementation.

TABLE 2

| Type of Packet | Transmission Time | | RSSI (dBm) | CINR (dB) | Rate of packet transmitted by sensor close to Equivalent AP Packet | | Was Packet transmitted blindly? |
|---|---|---|---|---|---|---|---|
| Current Beacon Packet | 250,225 | mSec | −67 | 22 | | | |
| Equivalent AP Packets | 120,200 | mSec | −85 | 10 | 2 | mbps | No |
| | 20,500 | mSec | −92 | 6 | 1 | mbps | No |
| | 10,385 | mSec | −70 | 18 | 5.5 | mbps | No |
| | 1,267 | mSec | −54 | 26 | 1 | mbps | No |
| | 256 | mSec | −48 | 30 | 11 | mbps | No |
| | 129 | mSec | −88 | 11 | 1 | mbps | Yes |

In one aspect of the present disclosure, the closest equivalent access point packet is identified as the equivalent access point packet with the minimum difference (D) in one or more parameters from the parameters of the current beacon packet. The closest equivalent access point packet may also be identified based on its close proximity to a packet transmitted non-blindly by the wireless device and/or based on the difference. For example, the transmission rate for non-blindly transmitted packet in close proximity to the closest equivalent access point packet is identified to facilitate determination of the desirable communication (e.g., transmission) rate at which the sensor communicates. Identifying the closest equivalent access point packet may also be implemented with respect to the tolerance of the single channel coherence time described.

When the closest equivalent access point packet, such as the equivalent access point packet at time=10,385 mSec, with a RSSI=−70 dBm and a CINR=18 dB, is identified or selected, the difference or delta between the CINR and RSSI metrics of the selected closest equivalent access point packet and the current beacon packet may be calculated and illustrated in Table 3, as follows:

TABLE 3

|  | RSSI (dBm) | CINR (dBm) | Transmission Rate for Non-Blindly transmitted packet close to "Closest Equivalent Packet" |
|---|---|---|---|
| Current Beacon Packet | −67 | 22 | N/A |
| Closest Equivalent AP Packet | −70 | 18 | 5.5 mbps |
| Delta | −3 | −4 | N/A |

Table 3 shows two packets (first packet and second packet) that were transmitted by an access point. The first packet (i.e., current beacon packet having −67 dBm RSSI and 22 dB CINR) was transmitted by the access point (and successfully received by the sensor) prior to the sensor being turned off. The first packet information being stored on the sensor's packet table prior to turning off the sensor. The second packet (i.e., closest equivalent access point packet having −70 dBm RSSI and 18 dB CINR) is the packet that was seen by the sensor after being transmitted by the access point after the sensor is turned back on. The second packet is seen by the sensor close to the time the sensor wants to transmit a packet after being turned on.

If the difference or delta between the CINR and RSSI of the current beacon packet and the closest equivalent access point packet is negative (as illustrated in Table 3), the larger (with respect to absolute value or magnitude) of the RSSI and the CINR deltas may be used to select the modulation rate for transmitting sensor data/packets by the Wi-Fi enabled sensor according to the rate selection implementation described herein. In the example illustrated in Table 3, the CINR delta of magnitude 4 is used to select the transmission rate for transmitting the sensor's packet. This feature may be implemented with respect to parameters stored in the memory (e.g., Table 4) showing the CINR deltas between modulation rates.

In some aspects, because the closest packet (e.g., closest equivalent access point packet) that was recorded as being received by the sensor from the access point had RSSI and CINR figures that are slightly higher than those of the packet currently received (e.g., current beacon packet) by the sensor from the access point after being turned on. As noted the RSSI of the closest equivalent access point packet is 3 dB higher than the RSSI of the current beacon packet while the CINR of the closest equivalent access point packet is 4 dB higher than the CINR of the current beacon packet. In this case, the sensor may select a modulation rate to transmit a packet that is slightly higher than the modulation rate used to successfully transmit near the time where the −67 dBm RSSI/22 dB CINR packet was transmitted from the access point. Table 4 is an exemplary illustration of modulation rate selection according to some aspects of the present disclosure.

Table 4 is an exemplary theoretical table showing the CINRs that are specified (theoretically) to demodulate a packet of a given transmission rate. Table 4 shows that a 1 mbps packet specifies or corresponds to a 6 dB CINR, a 2 mbps packet specifies a 9 dB CINR, a 5.5 mbps packet specifies a 12 dB CINR and an 11 mbps packet specifies a 20 dB CINR. The table shows the delta between the specified CINRs from one modulation rate to the next (e.g., 3 dB between 1 and 2 mbps, 3 dB between 2 and 5.5 mbps and 8 dB between 5.5 and 11 mbps).

For example, column 3 of Table 4 illustrates a difference or delta between consecutive CINR, which indicate an increase in power or intensity to transmit a modulation rate following an immediate lower rate. For example, modulation rate of 2 mbps with a corresponding CINR of 6 dB immediately follows modulation rate 1 mbps with a corresponding CINR of 9 dB. The difference between these consecutive CINRs is 3 dB as illustrated in column 3 of FIG. 4. This (exemplary) deltas between specified CINRs associated with the modulation rates are used in conjunction with Table 3 to determine the modulation rate that the sensor transmits a packet after reception of the −70 dBm RSSI/18 dB CINR packet, for example, from the access point after the sensor is turned back on.

The CINR, modulation rate and other parameters in Table 4 and other tables may be selected for illustrative purposes.

TABLE 4

| Modulation Rate | Needed CINR to receive a packet | CINR delta from immediate lower data rate |
|---|---|---|
| 1 mbps | 6 dB |  |
| 2 mbps | 9 dB | 9 dB − 6 dB = 3 dB |
| 5.5 mbps | 12 dB | 12 dB − 9 dB = 3 dB |
| 11 mbps | 20 dB | 20 dB − 12 dB = 8 dB |

The modulation rate at which transmission of the packet may start is the rate that is closest to the larger or maximum (with respect to absolute value or magnitude) of the RSSI and the CINR deltas associated with the closest equivalent packet corresponding to the current beacon packet. The delta between the RSSI of the packet transmitted by the access point before turn off and the packet transmitted by the access point after turn on is −3 dB. The delta between the CINR of the packet transmitted by the access point before turn off and the packet transmitted by the access point after turn on is −4 dB. In this case, the delta used to calculate the modulation rate the node should transmit is the larger of the RSSI and the CINR deltas (i.e., −4 dB). The following example illustrates this feature:

Maximum delta=maximum(RSSI delta,CINR delta)=maximum(−3,−4)=−4

The corresponding rate at which transmission of the packet closest to the equivalent packet was transmitted is 5.5 mbps, which corresponds to a CINR of 12 dB (i.e., 5.5 mbps specifies or requires 12 dB CINR for successful demodulation as illustrated in Table 4). The CINR available for current transmission may be defined by a difference between the corresponding CINR of 12 dB, which is the CINR specified to receive a packet at 5.5 mbps, and the maximum delta.

Thus, CINR available for current packet transmission=12 dB−4 dB=8 dB

In some aspects, the modulation rate for transmitting the sensor's packet may be the modulation rate that corresponds to at most 12 dB−4 dB=8 dB CINR.

In some aspects, modulation rate at which transmission of the packet may start may be the rate that closely corresponds to CINR available for current packet transmission. For example, based on Table 4, the rate at which the current packet should start transmission by the sensor corresponds to a rate that is possible with an 8 dB CINR, which corresponds to 1 mbps.

If there has not been any equivalent access point (AP) packet transmitted before (for example, the sensor was powered on) a new packet starts to be transmitted at the lowest available data rate to make transmission succeed with the highest likelihood for the first packet attempt regardless of channel conditions. The packet transmitted according to this configuration is defined as a blindly transmitted packet because the transmission rate was not selected via the rate selection implementation described here.

In one aspect of the present disclosure, the sensor may change the recommendation of data rate for packet transmission every predetermined number or amount (N) of transmitted packets. The recommendation for the data rate change may be based on the calculation associated with Table 3 and 4. The calculation involves identifying or selecting the modulation rate at which transmission of the packet may start, which corresponds to the rate that is closest to the larger or maximum (with respect to absolute value or magnitude) of the RSSI and the CINR deltas associated with the closest equivalent packet corresponding to the current beacon packet.

In one aspect of the disclosure, changing the recommendation of data rate for packet transmission every predetermined number or amount (N) of transmitted packets may be based on the rate associated with the maximum delta, increased to a rate of the immediate higher rate. The feature may be implemented in accordance with a blindly transmitted packet. For example, if the Nth packet was going to be transmitted blindly, the following steps may be implemented:

As noted, the corresponding rate at which transmission of the packet closest to the equivalent packet was transmitted is 5.5 mbps, which corresponds to a CINR of 12 dB (in Table 4). The CINR available for current transmission may be defined by a difference between the corresponding CINR of 12 dB, which is the CINR specified to receive a packet at 5.5 mbps, and the maximum delta.

Thus, CINR available for current packet transmission=12 dB−4 dB=8 dB

In this aspect, the rate at which the current packet should start transmission by the sensor is 2 mbps. This 2 mbps rate corresponds to a rate that is possible with a 16 dB CINR (i.e. 1 mbps), increased by an additional data rate (i.e. 1 mbps). In particular, the transmission rate is increased from the selected 1 mbps to be 2 mbps to allow the rate selection implementation to select a higher rate to avoid the likelihood of packet transmission failure for a blindly transmitted packet.

After the packet is transmitted at the selected data rate (either per the calculation with or without the increased rate), if an acknowledgement is received for the packet, the sensor powers off its radio upon completion of the radio's activity. If no acknowledgement is received, the sensor retransmits the packet at the selected rate for a selected number (M) of attempts, where M is selected empirically based on the implementation. If the sensor fails to receive an acknowledgement after M attempts at the selected data rate, the sensor reduces the data rate to the immediate lower data rate, transmits the packet at the lower data rate. The date rates selected may be based on the stored parameters, such as the data rates in Table 4. As previously described, the sensor may be powered off upon receipt of an acknowledgment at the lower data rate or the packet may be retransmitted for the selected number (M) of attempts as described. If all data rates have been tried and the packet is still not acknowledged by the access point, a MAC layer will indicate a failure to transmit the packet.

Figure 2:
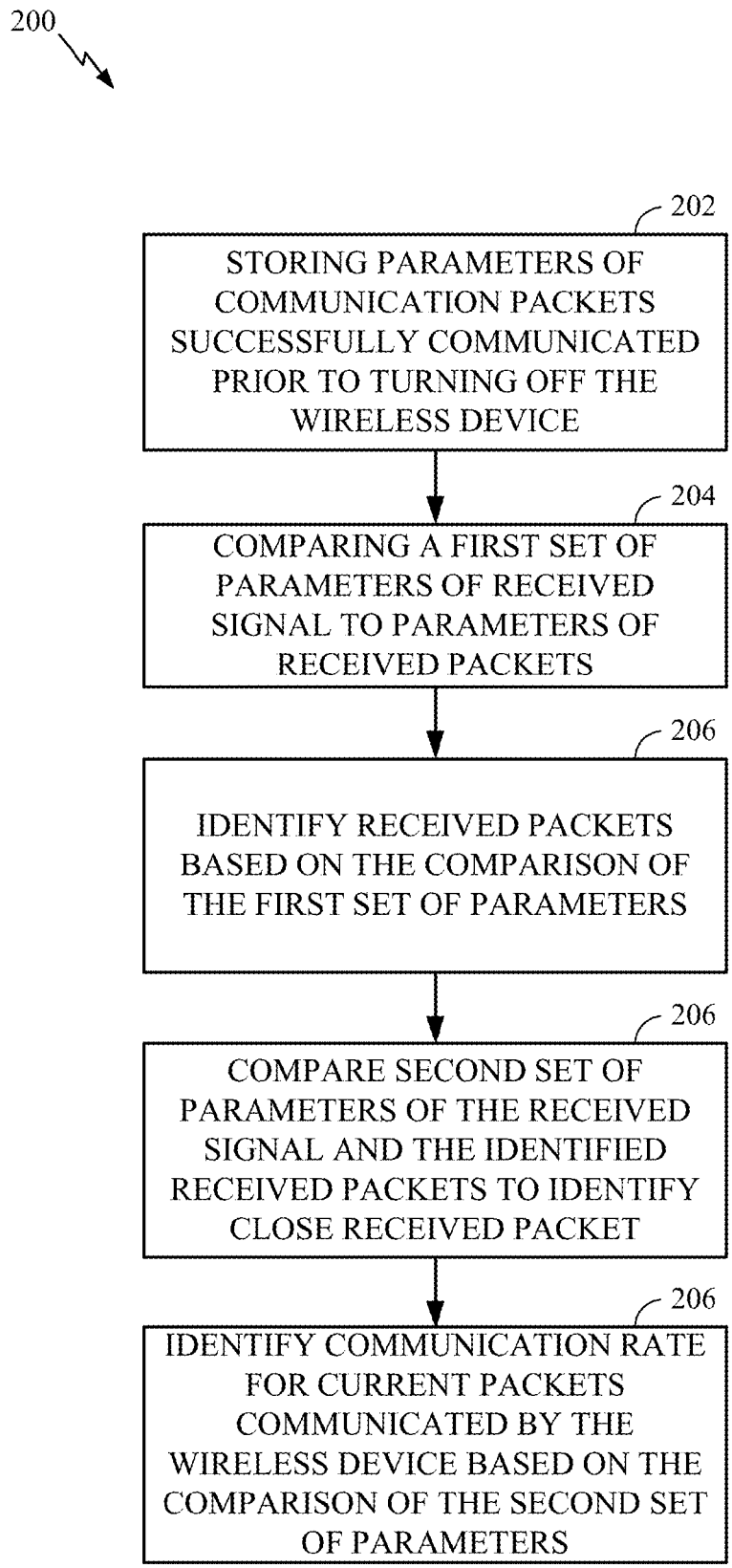
FIG. 2 illustrates a method for rate adaptation for WiFi based wireless sensor devices according to one or more aspects of the disclosure.

FIG. 2 illustrates rate adaptation or selection method for WiFi based wireless sensor devices according to one or more aspects of the disclosure. In block 202, a wireless device or system (e.g., sensor, processor or controller, rate selection module described herein) may store parameters of communication packets successfully transmitted and received by a wireless device prior to turning off a wireless device. The parameters may be stored in a memory integrated in the wireless device or independent but coupled to the wireless device. In block 204, the wireless device or system compares a first set of parameters of a received communication signal to the parameters of the received communication packets. In block 206, the wireless device or system identifies at least one received communication packet of the communication packets based on the comparison of the first set of parameters. In block 208, the wireless device or system compares a second set of parameters of the received communication signal to the parameters of the identified at least one received communication packet to identify a close received communication packet of the identified at least one received communication packet. In block 210, the wireless device or system identifies a communication rate for current packets communicated by the wireless device based on the comparison of the second set of parameters.

Figure 3:
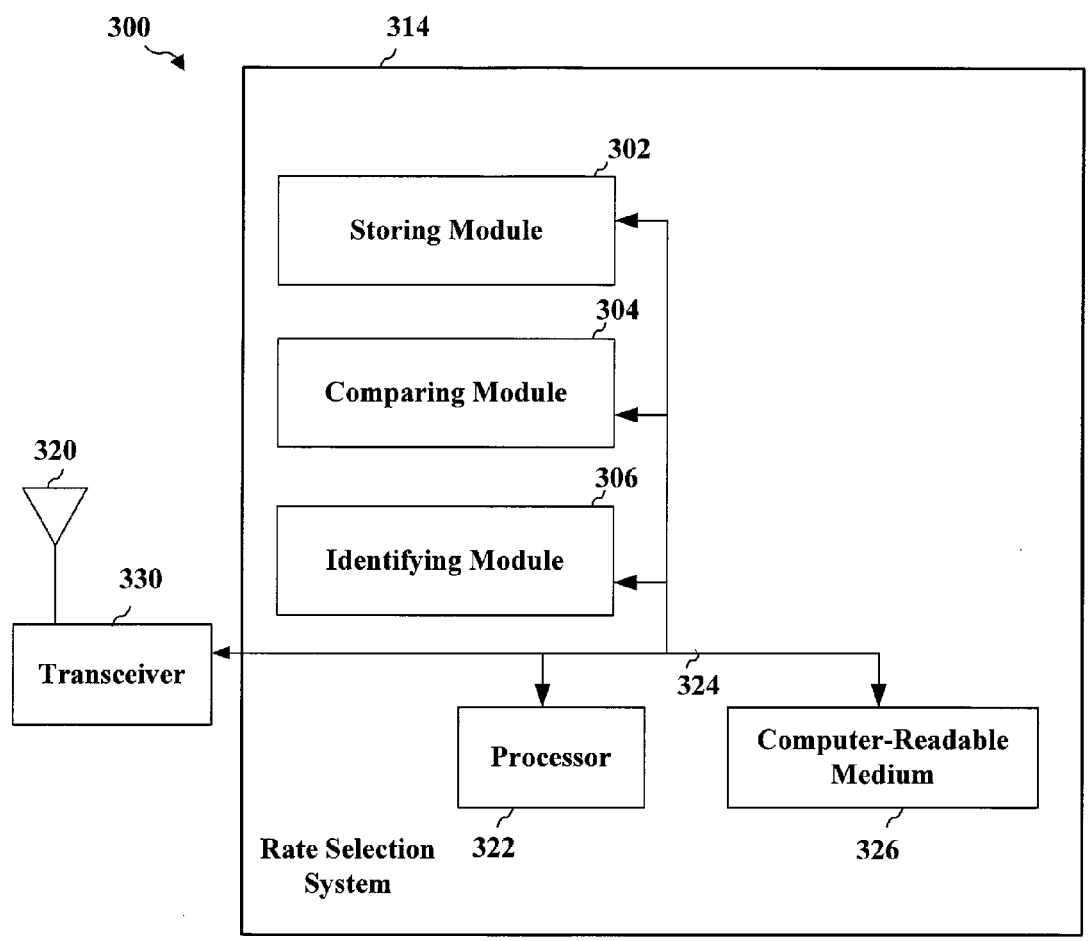
FIG. 3 is a diagram illustrating an example of a hardware implementation for an apparatus employing a virtual gap pattern system.

FIG. 3 is a diagram illustrating an example of a hardware implementation for an apparatus 300 employing a rate selection system 314. The rate selection system 314 may be implemented with a bus architecture, represented generally by the bus 324. The bus 324 may include any number of interconnecting buses and bridges depending on the specific application of the rate selection system 314 and the overall design constraints. The bus 324 links together various circuits including one or more processors and/or hardware modules, represented by the processor 322, the modules 302, 304, 306 and the computer-readable medium 326. The bus 324 may also link various other circuits such as timing sources, peripherals, voltage regulators, and power management circuits, which are well known in the art, and therefore, will not be described any further.

The apparatus includes a rate selection system 314 coupled to a transceiver 330. The transceiver 330 is coupled to one or more antennas 320. The transceiver 330 enables communicating with various other apparatus over a transmission medium. The rate selection system 314 includes a processor 322 coupled to a computer-readable medium 326. The processor 322 is responsible for general processing, including the execution of software stored on the computer-readable medium 326. The software, when executed by the processor 322, causes the rate selection system 314 to perform the various functions described for any particular apparatus. The computer-readable medium 326 may also be used for storing data that is manipulated by the processor 322 when executing software.

The rate selection system 314 includes a storing module 302 for storing parameters of communication packets successfully transmitted and received by a wireless device prior to turning off a wireless device. The rate selection system 314 includes a comparing module 304 for comparing a first set of parameters of a received communication signal to the parameters of the received communication packets and for comparing a second set of parameters of the received communication signal to the parameters of the identified at least one received communication packet. The rate selection system 314 includes an identifying module 306 for identifying at least one received communication packet of the communication packets based on the comparison of the first set of parameters and for identifying a communication rate for current packets communicated by the wireless device based on the comparison of the second set of parameters. The modules may be software modules running in the processor 322, resident/stored in the computer-readable medium 326, one or more hardware modules coupled to the processor 322, or some combination thereof. The rate selection system 314 may be a component of the wireless device 110 and may include the memory, and/or controllers/processors.

In one configuration, an apparatus such as the wireless device is configured for wireless communication including means for storing parameters of communication packets successfully transmitted and received by a wireless device prior to turning off a wireless device. In one aspect, the above means may be the storing module 302, the computer readable medium, a memory integrated into the wireless device 110 and/or independent but coupled to the wireless device 110 and/or the rate selection system 314 configured to perform the functions recited by the aforementioned means. In another aspect, the aforementioned means may be a module or any apparatus configured to perform the functions recited by the aforementioned means.

In one configuration, an apparatus such as a wireless device is configured for wireless communication including means for comparing. In one aspect, the above means may be the comparing module 304, the a controller/processor integrated into the wireless device 110 and/or independent but coupled to the wireless device 110 and/or the rate selection system 314 configured to perform the functions recited by the aforementioned means. In another aspect, the aforementioned means may be a module or any apparatus configured to perform the functions recited by the aforementioned means.

In one configuration, an apparatus such as a wireless device is configured for wireless communication including means for identifying. In one aspect, the above means may be the identifying module 306, the a controller/processor integrated into the wireless device 110 and/or independent but coupled to the wireless device 110 and/or the rate selection system 314 configured to perform the functions recited by the aforementioned means. In another aspect, the aforementioned means may be a module or any apparatus configured to perform the functions recited by the aforementioned means.

Although specific circuitry has been set forth, it will be appreciated by those skilled in the art that not all of the disclosed circuitry is required to practice the disclosed embodiments. Moreover, certain well known circuits have not been described, to maintain focus on the disclosure.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine or computer readable medium tangibly embodying instructions may be used in implementing the methodologies described herein. For example, software code may be stored in a memory and executed by a processor. When executed by the processor, the executing software code generates the operational environment that implements the various methodologies and functionalities of the different aspects of the teachings presented herein. Memory may be implemented within the processor or external to the processor. As used herein, the term "memory" refers to any type of long term, short term, volatile, nonvolatile, or other memory and is not to be limited to any particular type of memory or number of memories, or type of media upon which memory is stored.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium.

The machine or computer readable medium that stores the software code defining the methodologies and functions described herein includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. As used herein, disk and/or disc includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

The description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, in which reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method comprising:
   storing parameters of communication packets successfully transmitted and received by a wireless device prior to turning off the wireless device;
   comparing a first set of parameters of a current communication signal received after turning on the wireless device to the parameters of the received communication packets stored prior to turning off the wireless device;
   identifying at least one received communication packet of the received communication packets stored prior to turning off the wireless device based on the comparison of the first set of parameters;
   comparing a received signal strength indicator (RSSI) and carrier to interference-plus-noise ratio (CINR) of the current communication signal received after turning on the wireless device to an RSSI and CINR of the identified at least one received communication packet to identify a close received communication packet of the identified at least one received communication packet; and
   identifying a communication rate for current packets communicated by the wireless device based on the comparison of the RSSI and CINR of the current communication signal to the RSSI and CINR of the identified at least one received communication packet.

2. The method of claim 1, in which:
   the first set of parameters comprise communication rates; and
   comparing the first set of parameters further comprises comparing a communication rate of the current communication signal to the communication rates of the received communication packets to identify the at least one received communication packet.

3. The method of claim 1, in which the stored parameters of the communication packets comprise a time a communication packet was transmitted/received, transmission rate for a communication packet transmission, an RSSI, a CINR, an indication of whether the communication packets are acknowledged and/or an indication of whether the packets were transmitted blindly.

4. The method of claim 1, in which identifying the close received communication packet further comprises determining an absolute value of a difference between the RSSI and/or the CINR of the current communication signal and the identified at least one received communication packet.

5. The method of claim 4, in which the close received communication packet comprises a smallest difference in RSSI and/or the CINR with respect to the current communication signal.

6. The method of claim 5, further comprising calculating a difference between the RSSI of the identified close received communication packet and the RSSI of the current communication signal and calculating the difference between the CINR of the identified close received communication packet and the CINR of the current communication signal.

7. The method of claim 6, further comprising selecting a greater of the absolute value of the difference in RSSI and the absolute value of the difference in CINR to determine a value of the RSSI or the CINR available for the current packets communicated by the wireless device.

8. The method of claim 1, in which an initial communication packet of the stored communication packets successfully transmitted by the wireless device comprises a blindly transmitted packet.

9. The method of claim 8, in which a communication rate for the blindly transmitted packet is increased to reduce a likelihood of packet transmission failure.

10. The method of claim 1, in which the at least one received communication packet is received within a predetermined time after a packet of the transmitted communication packets is successfully transmitted by the wireless device.

11. The method of claim 10, in which the packet of the transmitted communication packets is non-blindly transmitted by the wireless device.

12. The method of claim 1, in which a received packet of the received communication packets is stored if received within a predetermined time after a packet of the transmitted communication packets is successfully transmitted by the wireless device.

13. An apparatus for wireless communication comprising:
   means for storing parameters of communication packets successfully transmitted and received by a wireless device prior to turning off the wireless device;
   means for comparing a first set of parameters of a current communication signal received after turning on the wireless device to the parameters of the received communication packets stored prior to turning off the wireless device;
   means for identifying at least one received communication packet of the received communication packets stored prior to turning off the wireless device based on the comparison of the first set of parameters;
   means for comparing a received signal strength indicator (RSSI) and carrier to interference-plus-noise ratio (CINR) of the current communication signal received after turning on the wireless device to an RSSI and CINR of the identified at least one received communication packet to identify a close received communication packet of the identified at least one received communication packet; and
   means for identifying a communication rate for current packets communicated by the wireless device based on the comparison of the RSSI and CINR of the current communication signal to the RSSI and CINR of the identified at least one received communication packet.

14. The apparatus of claim 13, in which:
the first set of parameters comprise communication rates; and
the means for comparing the first set of parameters further comprises means for comparing a communication rate of the current communication signal to the communication rates of the received communication packets to identify the at least one received communication packet.

15. The apparatus of claim 13, in which the parameters of the communication packets comprise a time a communication packet was transmitted/received, transmission rate for a communication packet transmission, an RSSI, a CINR, an indication of whether the communication packets are acknowledged and/or an indication of whether the packets were transmitted blindly.

16. An apparatus for wireless communication, comprising:
a memory; and
at least one processor coupled to the memory and configured:
to store parameters of communication packets successfully transmitted and received by a wireless device prior to turning off the wireless device;
to compare a first set of parameters of a current communication signal received after turning on the wireless device to the parameters of the received communication packets stored prior to turning off the wireless device;
to identify at least one received communication packet of the received communication packets stored prior to turning off the wireless device based on the comparison of the first set of parameters;
to compare a received signal strength indicator (RSSI) and carrier to interference-plus-noise ratio (CINR) of the current communication signal received after turning on the wireless device to an RSSI and CINR of the identified at least one received communication packet to identify a close received communication packet of the identified at least one received communication packet; and
to identify a communication rate for current packets communicated by the wireless device based on the comparison of the RSSI and CINR of the current communication signal to the RSSI and CINR of the identified at least one received communication packet.

* * * * *